United States Patent
Chen

(10) Patent No.: US 7,353,724 B2
(45) Date of Patent: Apr. 8, 2008

(54) MULTI-SPEED TRANSMISSION WITH HI-LO OUTPUT TORQUE-TRANSMITTING MECHANISMS AND GEAR SETS

(75) Inventor: Joseph Young-Long Chen, Ann Arbor, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 311 days.

(21) Appl. No.: 11/285,679

(22) Filed: Nov. 21, 2005

(65) Prior Publication Data

US 2007/0113693 A1    May 24, 2007

(51) Int. Cl.
  *F16H 3/08*    (2006.01)
(52) U.S. Cl. .................................................. 74/331
(58) Field of Classification Search .............. 74/331, 74/329, 333
See application file for complete search history.

(56) References Cited

U.S. PATENT DOCUMENTS 7,070,534 B2 *  7/2006  Pelouch ................ 475/214
7,140,267 B2 * 11/2006  Haka ........................ 74/331

* cited by examiner

*Primary Examiner*—Dirk Wright

(57) ABSTRACT

A multi-speed transmission includes first and second output gear sets having co-planar intermeshing gears axially-spaced from one another. Each has a first gear intermeshing with a second gear, one of which is connected for common rotation with an output shaft or a first countershaft and the other of which is connected for rotation about and selectively engagable with the other of the output shaft and first countershaft by a respective output torque-transmitting mechanism. A direct drive torque-transmitting mechanism is selectively engageable for transferring torque from the input shaft to the output shaft when neither of the output torque-transmitting mechanisms is engaged. The first output torque-transmitting mechanism is engaged during underdrive gear ratios and the second output torque-transmitting mechanism is engaged during overdrive gear ratios. The order of engagement of torque-transmitting mechanisms during the underdrive gear ratios may be repeated during the overdrive gear ratios.

20 Claims, 5 Drawing Sheets

| Shaft | | POWER FLOW | | | | | | | |
|---|---|---|---|---|---|---|---|---|---|
| Position | Gear | C1 | C2 | C3 | C4 | DIR | CLO | CHI | CR |
|  | N |  |  |  |  |  | X |  |  |
| Odd | 1 | X |  |  |  |  | X |  |  |
| Even | 2 |  | X |  |  |  | X |  |  |
| Odd | 3 |  |  | X |  |  | X |  |  |
| Even | 4 |  |  |  | X |  | X |  |  |
| Odd | 5 |  |  |  |  | X | X |  |  |
| Even | 6 | X |  |  |  |  |  | X |  |
| Odd | 7 |  |  | X |  |  |  | X |  |
| Even | 8 |  |  |  | X |  |  | X |  |
| Even | R1 |  |  |  |  |  | X |  | X |

| Shaft Position | ENGAGED TORQUE-TRANSMITTING MECHANISMS | WIDE RATIO CHART ||||| |
|---|---|---|---|---|---|---|---|
| | | Gear | Speed | Output | Total | Step | |
| Odd | 97-C1-CLO | 1 | 3.294 | 1.226 | 4.038 | | |
| Even | 98-C2-CLO | 2 | 2.042 | 1.226 | 2.503 | 1.613 | |
| Odd | 97-C3-CLO | 3 | 1.613 | 1.226 | 1.977 | 1.266 | |
| Even | 98-C4-CLO | 4 | 1.303 | 1.226 | 1.597 | 1.238 | |
| Odd | 97-C-DIR | 5 | 1.000 | - | 1.000 | 1.597 | DIRECT |
| Even | 98-C2-CHI | 6 | 2.042 | 0.390 | 0.796 | 1.256 | |
| Odd | 97-C3-CHI | 7 | 1.613 | 0.390 | 0.629 | 1.266 | |
| Even | 98-C4-CHI | 8 | 1.303 | 0.390 | 0.508 | 1.238 | |
| Even | 98-CR-CLO | R1 | 2.7 | 1.226 | 3.310 | 82% | REV/1st |

| Shaft | | POWER FLOW | | | | | | |
|---|---|---|---|---|---|---|---|---|
| Position | Gear | C1 | C2 | C3 | DIR | CLO | CHI | CR |
| | N | | | | | | | |
| Odd | 1 | X | | | | X | | |
| Even | 2 | | X | | | X | | |
| Odd | 3 | | | X | | X | | |
| Even | 4 | | | | X | | | |
| Odd | 5 | X | | | | | X | |
| Even | 6 | | X | | | | X | |
| Even | R1 | | | | | X | | X |

| Shaft Position | ENGAGED TORQUE-TRANSMITTING MECHANISMS | WIDE RATIO CHART ||||| |
|---|---|---|---|---|---|---|---|
| | | Gear | Speed | Output | Total | Step | |
| Odd | 298-C1-CLO | 1 | 2.500 | 1.556 | 3.889 | | |
| Even | 297-C2-CLO | 2 | 1.697 | 1.556 | 2.611 | 1.489 | |
| Odd | 298-C3-CLO | 3 | 1.027 | 1.556 | 1.598 | 1.634 | |
| Even | 297-C-DIR | 4 | 1.000 | - | 1.000 | 1.598 | DIRECT |
| Odd | 298-C1-CHI | 5 | 2.500 | 0.333 | 0.833 | 1.200 | |
| Even | 297-C2-CHI | 6 | 1.679 | 0.333 | 0.56 | 1.489 | |
| Even | 297-CR-CLO | R1 | 2.047 | 1.556 | 3.185 | 82% | REV/1st |

MULTI-SPEED TRANSMISSION WITH HI-LO OUTPUT TORQUE-TRANSMITTING MECHANISMS AND GEAR SETS

TECHNICAL FIELD

The invention relates to a multi-speed transmission.

BACKGROUND OF THE INVENTION

Typical lay-shaft or dual clutch multi-speed transmissions have gear train arrangements with individual gear sets for each gear range (i.e., each gear ratio). Additionally, for a dual clutch design, two input friction clutches are also required. The total number of gears required in these typical designs is two times the number of forward speeds plus three for reverse and a pair of head or output gear sets for lay-shaft designs and one additional gear for the typical dual clutch transmission designs. The typical number of gear planes is one more than the number of forward gear ratios.

SUMMARY OF THE INVENTION

The invention provides output gear sets and output torque-transmitting mechanisms which allow gear sets to be reused, i.e., used in both underdrive and overdrive gear ratios, thus minimizing the number of total gears, gear planes and clutches or synchronizers required to achieve the desired number of forward gear ratios. An associated reduction in overall cost and a decrease in weight (with a corresponding fuel economy increase) may be realized.

A multi-speed transmission within the scope of the invention includes an input shaft, an output shaft and a first countershaft. A direct drive torque-transmitting mechanism is selectively engageable to transfer torque from the input shaft to the output shaft. A first output gear set is provided having co-planar, intermeshing gears. A second output gear set also has co-planar intermeshing gears that are axially-spaced from the first output gear set. Each of the first and second output gear sets has a first gear intermeshing with a second gear. One of the first and second gears in each set is connected for common rotation with either the output shaft or the first countershaft. The other of the first and second gears is connected for rotation about (i.e., is not fixed to) the other of the output shaft and the first countershaft. A first output torque-transmitting mechanism is selectively engageable to connect the gear of the first output gear set that is connected for rotation about the respective shaft with the respective shaft so that it rotates with the shaft. A second output torque-transmitting mechanism is selectively engageable to connect the gear of the second output gear set that is connected for rotation about the respective shaft with the respective shaft for common rotation therewith. The first output torque-transmitting mechanism is engaged during underdrive gear ratios and the second torque-transmitting mechanism is engaged during overdrive gear ratios. As will be readily understood by those skilled in the art, a different speed ratio is associated with each different gear ratio.

Because the first output torque-transmitting mechanism is engaged only during underdrive gear ratios and the second output torque-transmitting mechanism is engaged only during overdrive gear ratios, the transmission does not require dedicated gear sets for each forward gear ratio. Specifically, the transmission may include a plurality of additional co-planar gear sets each axially-spaced from the first and second output gear sets. Additional torque-transmitting mechanisms are selectively engageable in a first order during engagement of the first output torque-transmitting mechanism to transfer torque from the input shaft to the output shaft through at least some of the additional co-planar gear sets to thereby establish respective underdrive forward gear ratios. The additional torque-transmitting mechanisms are also separately selectively engageable in the same order during engagement of the second output torque-transmitting mechanism to transfer torque from the input shaft to the output shaft through at least some of the additional co-planar gear sets to thereby establish respective overdrive forward gear ratios. Thus, the first and second output torque-transmitting mechanisms act as a power splitter, directing power through the first output gear set during underdrive gear ratios and directing power through the second output gear set during overdrive gear ratios. Within the scope of the invention, the first and second output torque-transmitting mechanisms may be integrated in a single dual torque-transmitting mechanism movable in one direction to engage the first output gear set and in another direction to engage the second output gear set.

In one aspect of the invention, during engagement of the direct drive torque-transmitting mechanism to establish a direct drive gear ratio between the input shaft and the output shaft, no torque is present in the additional co-planar gear sets. Thus, when shifting from direct drive to the subsequent underdrive or overdrive gear ratio, relatively low effort is required. Thus, the activated shifting devices of the first or second output torque-transmitting mechanisms may be simple manual or electric solenoid valves. The first and second output torque-transmitting mechanisms, especially when integrated as a dual torque-transmitting mechanism, may be referred to herein as a "Hi-Lo" device. Because the torque-transmitting mechanisms are shifted from direct drive gear ratio to the subsequent overdrive or underdrive gear ratios with no torque being present on other gears, the transmission need not be fully stopped or operated at a very low speed in order to make the shift, as is normally necessary with a conventional power splitter on a construction or a highway military vehicle.

The first and second output gear sets and first and second output torque-transmitting mechanisms described above may be employed on lay shaft or dual clutch transmissions. For instance, a six-speed lay shaft transmission has a first, second and third input gear set (also referred to herein as forward speed gear sets), each with co-planar intermeshing gears and each axially-spaced from one another and from the first and second output gear sets. First, second and third torque-transmitting mechanisms are selectively engageable for connecting a different selective one of the gears of the input gear sets with the first countershaft to transfer torque from the input shaft to the first countershaft. Selective engagement of the torque-transmitting mechanisms thereby establishes six forward gear ratios. If a fourth input gear set is added as well as a fourth torque-transmitting mechanism that is selectively engageable to connect one of the gears of the fourth input gear set with the first countershaft, then eight forward gear ratios may be achieved. In a dual-clutch transmission design, a second countershaft is required along with first and second input torque-transmitting mechanisms that are alternatively selectively engageable to transfer torque from the input shaft to one of the first, second and third input gear sets or, in an eight-speed arrangement, to the fourth input gear set. A reverse gear set may also be employed that has intermeshing gears axially-spaced from the output gear sets and the other input gear sets. At least one of the gears of the reverse gear set rotates about the first countershaft. A reverse torque-transmitting mechanism is selectively engageable to connect the gear of the reverse gear set that rotates about the first countershaft with the first countershaft for common rotation therewith. In an alternative dual-clutch transmission design, the first and second input torque-transmitting mechanisms engage the countershafts with a respective transfer shaft. A respective member of each of the output gear sets is connected for common rotation with the respective transfer shafts.

With the gear sets and torque-transmitting mechanisms described above, a six-speed lay shaft transmission will require only 13 gears while and eight-speed lay shaft transmission will require only 15 gears (only 14 if the alternative dual-clutch design is utilized in which the input torque-transmitting mechanisms engage the countershafts with the transfer shafts). The six-speed dual clutch transmission described above requires only 15 gears while the eight-speed dual clutch transmission requires only 17 gears (only 16 if the alternative dual-clutch design is utilized in which the input torque-transmitting mechanisms engage the countershafts with the transfer shafts).

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figures 1A, 1B:
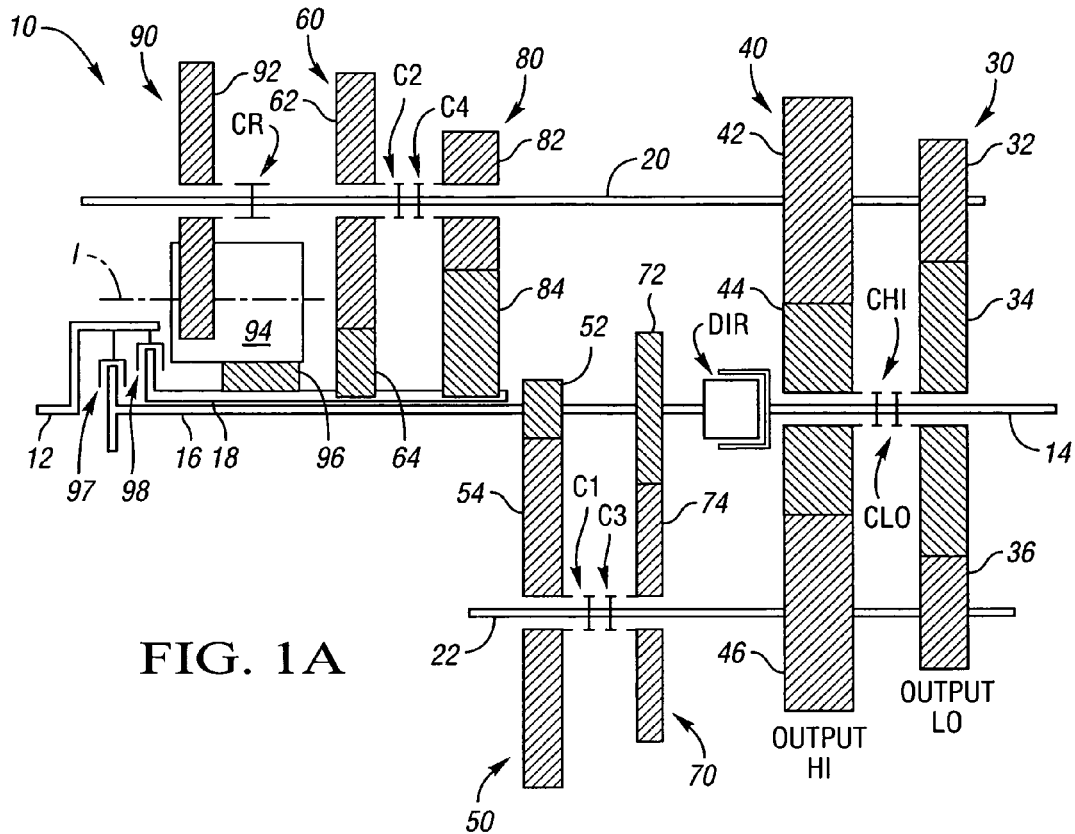
FIG. 1A is a schematic partially cross-sectional view of an eight-speed dual clutch transmission within the scope of the invention.
FIG. 1B is a truth table listing torque-transmitting mechanism engagement for each of the gear ratios of the transmission of FIG. 1A.

Referring to FIG. 1, a multi-speed dual clutch transmission 10 is depicted. The transmission 10 includes an input shaft 12 and an output shaft 14. The input shaft 12 is continuously connected with a power source such as a conventional internal combustion engine (not shown) and the output shaft 14 is continuously connected with a final drive unit (not shown). An intermediate shaft 16, also referred to as an odd shaft, is concentric with an intermediate shaft 18, also referred to as an even shaft. A countershaft 20 and a countershaft 22 are each radially-displaced from the input and output shafts 12, 14 and the odd and even shafts 16 and 18.

The transmission 10 has several gear sets axially-spaced from one another each including intermeshing gears all of which are co-planar in each set (except possibly a set employed for a reverse gear ratio), as will be described below. A first output gear set 30 includes co-planar intermeshing gears 32, 34 and 36. Gear 32 is fixed for common rotation with countershaft 20 and intermeshes with gear 34 which rotates about the output shaft 14. Gear 36 intermeshes with gear 34 and is fixed for common rotation with countershaft 22.

A second output gear set 40 includes gears 42, 44 and 46. Gear 42 is fixed for common rotation with countershaft 20 and intermeshes with gear 44 which rotates about output shaft 14. Gear 44 intermeshes with gear 46 which is fixed for common rotation with countershaft 22.

The transmission 10 further includes several forward speed gear sets (forward speed gear sets are also refereed to in the claims as "input gear sets") including first forward speed gear set 50. The first forward speed gear set 50 includes gears 52 and 54. Gear 52 is fixed for common rotation with odd shaft 16 and intermeshes with gear 54 which rotates about countershaft 22. A second forward speed gear set 60 includes gear 62 and gear 64. Gear 62 rotates about countershaft 20 and intermeshes with gear 64 which is fixed for common rotation with even shaft 18. A third forward speed gear set 70 includes gear 72 and gear 74. Gear 72 is fixed for common rotation with odd shaft 16 and intermeshes with gear 74 which rotates about countershaft 22. A fourth forward speed gear set 80 includes gears 82 and 84. Gear 82 rotates about countershaft 20 and intermeshes with gear 84 which is fixed for common rotation with even shaft 18. A reverse speed gear set 90 includes gears 92, 94 and 96. Gear 92 rotates about countershaft 20 and intermeshes with gear 94 which is an idler gear rotating about idler axis I. Gear 94 also intermeshes with gear 96 which is fixed for common rotation with the even shaft 18. Each of the gear sets 30, 40, 50, 60, 70 and 80 are co-planar and axially-spaced from one another. The reverse gear set 90 is axially-spaced from the others and may be co-planar or may have gear 92 axially offset from gear 96 through idler gear 94.

The transmission 10 includes numerous torque-transmitting mechanisms which are selectively engageable to transfer torque from the input shaft 12 to the output shaft 14 at various gear ratios. A first input clutch 97 is selectively engageable to connect the input shaft 12 with the odd shaft 16. A second input clutch 98 is selectively engageable to transfer torque to connect the input shaft 12 with the even shaft 18. The input clutches 97 and 98 are alternatively selectively engageable to establish, along with engagement of other torque-transmitting mechanisms described below, the eight forward gear ratios listed in FIGS. 1B and 1C. As is discussed below with respect to FIG. 5, an alternative dual-clutch transmission having input clutches arranged on the countershafts 20, 22 rather than on concentric odd and even shafts may be utilized within the scope of the invention.

A torque-transmitting mechanism CR is selectively engageable to connect gear 92 with the countershaft 20 for common rotation therewith. A torque-transmitting mechanism C1 is engageable to connect gear 54 with countershaft 22 for common rotation therewith. A torque-transmitting mechanism C2 is selectively engageable to connect gear 62 with countershaft 20 for common rotation therewith.

Torque-transmitting mechanism C3 is selectively engageable to connect gear 74 with countershaft 22 for common rotation therewith. Torque-transmitting mechanism C4 is selectively engageable to connect gear 82 with countershaft 20 for common rotation therewith. A direct drive torque-transmitting mechanism DIR is selectively engageable to connect the odd shaft 16 with the output shaft 14. A first output torque-transmitting mechanism CLo (referred to in the drawings as CLO) is selectively engageable to connect the gear 34 with the output shaft 14 for common rotation therewith. A second output torque-transmitting mechanism CHi (referred to in the drawings as CHI) is selectively engageable to connect gear 44 with the output shaft 14 for common rotation therewith. The first and second output torque-transmitting mechanisms CHi and CLo may be integrated as a dual torque-transmitting mechanism and referred to as a Hi-Lo shifting device. The torque-transmitting mechanism DIR is preferably a dog clutch, the torque-transmitting mechanisms CR, C1, C2, C3, C4 and CLo and CHi are preferably synchronizers, and the torque-transmitting mechanisms 97 and 98 are friction clutches. The torque-transmitting mechanisms C2 and C4 may be integrated as a dual synchronizer shiftable to the left to engage gear 62 with countershaft 20 or to the right to engage gear 82 with countershaft 20. Similarly, torque-transmitting mechanism C1 and C3 may be integrated as a dual synchronizer shiftable to the left to engage gear 54 with countershaft 22 or to the right to engage gear 74 with countershaft 22.

The discussion will now turn to the manner in which the eight forward gear ratios and the reverse gear ratio are achieved by the transmission 10. To establish the reverse gear ratio (indicated as R1 in FIGS. 1B and 1C), torque-transmitting mechanisms 98, CLo and CR are engaged. The torque-transmitting mechanism 98 establishes the transfer of torque from the input shaft 12 to even shaft 18 and is indicated in the shaft position column of FIG. 1B by the notation "Even." CR connects gear 92 for common rotation with countershaft 20 and CLo connects gear 34 with the output shaft 14. Torque is thus transferred from the input shaft 12 to even shaft 18 and from even shaft 18 through gear set 90 to countershaft 20. Engaged torque-transmitting mechanism CR then transfers torque from gear 92 to countershaft 20. Engaged torque-transmitting mechanism CLo transfers torque transferred from countershaft 20 through the first output gear set 30 from gear 34 to output shaft 14.

In the neutral position, neither of the first or second input clutches 97 and 98 is engaged, so torque is not transferred from the input shaft 12 to output shaft 14. However, CLo may be engaged so that it is preset for either the oncoming reverse or first forward gear ratio, both of which require the engagement of CLo. Specifically, in the first forward gear ratio referred to as "Gear 1" in FIGS. 1B and 1C, the first input clutch 97, C1 and CLo are engaged. Torque is thus transferred from input shaft 12 to odd shaft 16 via engaged first input clutch 97 through first forward speed gear set 50 to countershaft 22 via engaged torque-transmitting mechanism C1 and finally through the first output gear set 30 to the output shaft 14 via the engaged output torque-transmitting mechanism CLo.

To establish the second forward gear ratio, the second input clutch 98, C2 and CLo are engaged. That is, CLo remains engaged in shifting from the first to the second forward gear ratio, while the first input clutch 97 and C1 are released and the second input clutch 98 and C2 are applied. The second input clutch 98 and C2 may be preselected prior to release of clutch 97 and C1. Torque is thus transferred from input shaft 12 to the even shaft 18 via second input clutch 98 and through the second forward gear set 60 to countershaft 20 via engaged torque-transmitting mechanism C2. Finally, torque is transferred from countershaft 20 to output shaft 14 through the first output gear set 30 through engaged torque-transmitting mechanism CLo.

To establish the third forward gear ratio, torque-transmitting mechanism input clutch 97, C3 and CLo are engaged. That is, CLo remains engaged in shifting from the second to the third forward gear ratio while the second input clutch 98 and C2 are released and the first input clutch 97 and C3 are applied. Clutch 97 and C3 may be preselected prior to release of clutch 98 and C2. Thus, torque is transferred from input shaft 12 to odd shaft 16 via engaged torque-transmitting mechanism 97, through the third forward speed gear set 70 to countershaft 22 via engaged torque-transmitting mechanism C3 and, finally, to the output shaft 12 through the first output gear set 30 via engaged first output torque-transmitting mechanism CLo.

To establish the fourth forward gear ratio, the second input clutch 98, C4 and CLo are engaged. That is, CLo remains engaged in shifting from the third to the fourth forward gear ratio while the first input clutch 97 and C3 are released and the second input clutch 98 and C4 are applied. Clutch 98 and C4 may be preselected prior to release of clutch 97 and C3. Thus, torque is transferred from input shaft 12 to even shaft 18 via engaged second input clutch 98 through fourth forward speed gear set 80 to countershaft 20 via engaged C4 and finally to output shaft 14 through first output gear set 30 via engaged first output torque-transmitting mechanism CLo.

A fifth forward gear ratio, which is a direct drive gear ratio, is established with the engagement of the first input clutch 97 and the direct drive torque-transmitting mechanism DIR. That is, clutches 98, C4 and CLo are released while clutch 97 and DIR are applied. Thus, torque is transferred from input shaft 12 to odd shaft 16 via engaged first input clutch 97 and from the odd shaft 16 to output shaft 14 via engagement of torque-transmitting mechanism DIR. Neither CLo nor CHi is engaged during the fifth forward gear ratio. In the fifth forward gear ratio, there is no torque present on either of the countershafts 20, 22.

To establish the sixth forward gear ratio, the second input clutch 98, C2 and CHi are engaged. That is, clutch 97 and DIR are released while clutch 98, C2 and CHi are engaged. Thus, torque is transferred from the input shaft 12 to the even shaft 18 via engaged second input clutch 98 through second forward speed gear set 60 to countershaft 20 via engaged torque-transmitting mechanism C4 and finally through the second output gear set 40 via engaged second output torque-transmitting mechanism CHi to the output shaft 14.

To establish the seventh forward gear ratio, the first input clutch 97, C3 and CHi are engaged. That is, CHi remains engaged while clutch 98 and C2 are released and clutch 97 and C3 are applied. Clutch 97 and C3 may be preselected prior to release of clutch 98 and C2. Thus, torque is transferred from input shaft 12 to odd shaft 16 through engaged first input clutch 97 and then through the third forward speed gear set 70 to the countershaft 22 via engaged C3 and, finally, through the second output gear set 40 to the output shaft 14 via engaged second output torque-transmitting mechanism CHi.

To establish the eighth forward gear ratio, the second input clutch 98, C4 and CHi are engaged. That is, CHi remains engaged in shifting from the seventh forward gear ratio to the eighth forward gear ratio while the first input clutch 97 and the torque-transmitting mechanism C3 are released and the second input clutch 98 and torque-transmitting mechanism C4 are applied. Clutch 98 and C4 may be preselected prior to release of clutch 97 and C3. In the eighth forward gear ratio, torque is transferred from the input shaft 12 to the even shaft 18 via engaged second input clutch 98 and through the fourth forward speed gear set 80 to countershaft 20 via engaged torque-transmitting mechanism C4 and finally through the second output gear set 40 to the output shaft 14 via engaged second output torque-transmitting mechanism CHi.

Referring to the truth table of FIG. 1B in which power flow for each of the gear ratios is achieved by the indicted engaged clutches, it is clear that the order of engagement of input clutches 97 and 98 and the second, third and fourth torque-transmitting mechanism C2, C3, C4 in the second, third and fourth forward gear ratios is repeated in the overdrive sixth, seventh and eighth forward gear ratios, with the only change in engaged torque-transmitting mechanisms being a change from CLo in underdrive gear ratios to CHi in overdrive gear ratios. Thus, the second forward speed gear set 60 is used in both the second forward gear ratio and the sixth forward gear ratio, the third forward speed gear set 70 is used in both the third forward gear ratio and the seventh forward gear ratio and the fourth forward speed gear set 80 is used in both the fourth forward gear ratio and the eighth forward gear ratio.

It is evident from the truth table of FIG. 1B that CLo is engaged for underdrive gear ratios while CHi is engaged for overdrive gear ratios. Because no torque is present on the countershafts 20 and 22 in the fifth forward gear ratio, a shift from fourth to fifth, from fifth to fourth, from fifth to sixth or from sixth to fifth may be achieved by engaging CHi or CLo, as indicated in the truth table, and may be done dynamically. A dynamic shift would not be possible if CHi and CLo were required to be engaged in subsequent gear ratios. Thus, the transmission 10 of FIG. 1 is placed in the direct drive gear ratio (i.e., fifth forward speed) in which CHi and CLo are in disengaged, neutral position, in order to dynamically shift from underdrive to overdrive.

It will be readily apparent to one of ordinary skill in the art based upon the above described power flow arrangements with each of the forward gear ratios achieved from transmission 10, that on-coming torque-transmitting mechanisms may be preselected prior to engagement to achieve shifting without torque interruption or mechanical tie-up within the transmission 10.

Figures 1C, 2:
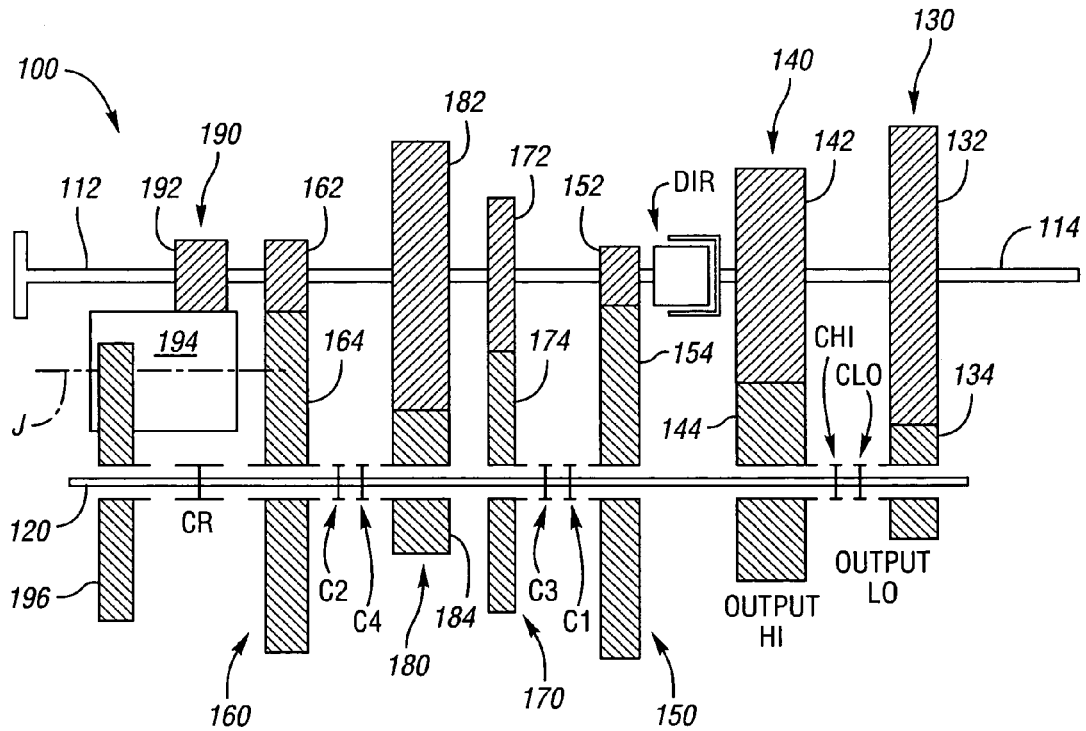
FIG. 1C is a gear ratio chart listing all gear ratios achieved by the transmission of FIG. 1A.
FIG. 2 is a schematic partially cross-sectional representation of an eight-speed lay shaft transmission within the scope of the invention.

Referring to FIG. 1C, sample gear ratios and ratio steps for each of the eight forward gear ratios and the reverse gear ratio described above are illustrated. The column labeled "Speed" refers to gear ratio achieved between the engaged input gear set and the input shaft 12. The engaged speed gear set is one of gear sets 50, 60, 70, 80 or 90 of FIG. 1A, depending on which is actively carrying torque due to engagement of one of the respective torque-transmitting mechanisms. The column labeled "Output" refers to gear ratio achieved through the active output gear set (i.e., either gear set 30 or 40 depending on whether CLo or CHi is engaged, respectively). The column labeled "Total" refers to the gear ratio between the input shaft 12 and output shaft 14 of FIG. 1A. The gear ratios listed in FIG. 1C are achieved by utilizing the following tooth gear counts; gears 32 and 36 each have 31 teeth; gear 34 has 38 teeth; gears 42 and 46 each have 59 teeth; gear 44 has 23 teeth; gear 52 has 17 teeth; gear 54 has 56 teeth; gear 62 has 49 teeth; gear 64 has 24 teeth; gear 72 has 31 teeth; gear 74 has 50 teeth; gear 82 has 43 teeth; gear 84 has 33 teeth; gear 92 has 27 teeth; and gear 96 has 20 teeth. A more narrow-ratio or a mid-ratio transmission may be achieved by utilizing other tooth gear counts, as is well understood by those skilled in the art.

Referring to FIG. 2, an alternative embodiment of a transmission 100 within the scope of the invention is illustrated. The transmission 100 is a lay shaft transmission rather than a dual clutch transmission like the transmission 10 of FIG. 1A. The transmission 100 includes an input shaft 112 and an output shaft 114. A countershaft 120 is offset from the input shaft 112 and the output shaft 114.

The transmission 100 includes a first output gear set 130 including gears 132 and 134. Gear 132 is connected for common rotation with output shaft 114 and intermeshes with gear 134 which rotates about countershaft 120. Transmission 100 further includes a second output gear set 140 which includes gear 142 connected for common rotation with output shaft 114 which intermeshes with gear 144 which rotates about countershaft 120.

The transmission 100 includes a first forward speed gear set 150 which has gears 152 and 154. Gear 152 is connected for common rotation with the input shaft 112 and intermeshes with gear 154 which rotates about countershaft 120.

The transmission 100 also includes a second forward speed gear set 160 having gears 162 and 164. Gear 162 is connected for common rotation with the input shaft 112 and intermeshes with gear 164 which rotates about the countershaft 120.

Transmission 100 also includes a third forward speed gear set 170 which includes gears 172 and 174. Gear 172 is connected for common rotation with the input shaft 112 and intermeshes with gear 174 which rotates about the countershaft 120.

Transmission 100 also includes fourth forward speed gear set 180 which has gears 182 and 184. Gear 182 is connected for common rotation with the input shaft 112 and intermeshes with gear 184 which rotates about the countershaft 120.

Finally, transmission 100 includes a reverse gear set 190 having gears 192, 194 and 196. Gear 192 is connected for common rotation with the input shaft 112 and intermeshes with gear 194 which is an idler gear rotating about axis J. Gear 196 intermeshes with idler gear 194 and rotates about the countershaft 120. As with the transmission 10 of FIG. 1A, each of the gear sets of the transmission 100 is axially-spaced from one another and the first and second output gear sets 130, 140, as well as the first, second, third and fourth forward speed gear sets 150, 160, 170 and 180, respectively, are each co-planar. The reverse gear set 190 may be co-planar or may be slightly offset through the idler gear with gear 192 being axially offset from gear 196.

The transmission 100 includes numerous torque-transmitting mechanisms. A first output torque-transmitting mechanism CLo is selectively engageable to connect the gear 134 with countershaft 120 for common rotation. CHi is a second output torque-transmitting mechanism selectively engageable to connect gear 144 with countershaft 120 for common rotation. CR is selectively engageable to connect gear 196 with countershaft 120 for common rotation. C1 is selectively engageable to connect gear 154 with countershaft 120 for common rotation. C2 is selectively engageable to connect gear 164 with countershaft 120 for common rotation. C3 is selectively engageable to connect gear 174 with countershaft 120 for common rotation. C4 is selectively engageable gear 184 with countershaft 120 for common rotation. A torque-transmitting mechanism DIR, the direct drive torque-transmitting mechanism, is selectively engageable to connect the input shaft 112 directly with the output shaft 114.

The torque-transmitting mechanisms of the transmission 100 may be engaged to establish eight forward gear ratios and a reverse gear ratio. Specifically, a reverse gear ratio is established with the engagement of CLo and CR. A first forward gear ratio is established with the engagement of C1 and CLo. A second forward gear ratio is established with the engagement of C2 and CLo. A third forward gear ratio is established with the engagement of C3 and CLo. A fourth forward gear ratio is established with the engagement of C4 and CLo. A fifth forward gear ratio is established with the engagement of DIR. To establish the sixth forward gear ratio, CHi and C2 are engaged. To establish the seventh forward gear ratio, C3 and CHi are engaged. To establish the eighth forward gear ratio, C4 and CHi are engaged. Those skilled in the art will readily understand the power flow through the transmission 100 in each of the eight forward gear ratios and reverse gear ratio based on the power flow description of the transmission 10 above.

Like the transmission 10 in FIG. 1A, the transmission 100 reuses gear sets in underdrive and overdrive gear ratios. Specifically, C2 is used in both the second forward gear ratio and the sixth forward gear ratio, C3 is used in both the third forward gear ratio and the seventh forward gear ratio, and C4 is used in both the fourth forward gear ratio and the eighth forward gear ratio. Additionally, the order of engagement of the torque-transmitting mechanisms C2, C3 and C4 is repeated in the underdrive gear ratios (second, third and fourth gear ratios) and overdrive gear ratios (sixth, seventh and eighth gear ratios).

As with the transmission 10 of FIG. 1A, those skilled in the art will readily understand that no torque is present on countershaft 120 during the fifth forward gear ratio (i.e., the direct drive gear ratio). Thus, in shifting from fifth forward gear ratio to either the fourth forward gear ratio (by engaging C4 and CLo) or the sixth forward gear ratio (by engaging C2 and CHi), no torque or power flow will be present in the fourth forward speed gear set 180 through which power flows during the fourth forward gear ratio nor in the second forward speed gear set 160 through which power flows in the sixth forward gear ratio. Thus, the shift to engage either CLo (the fourth forward gear ratio) or CHi (for the sixth forward gear ratio) may occur at the direct drive range with very low effort required to active shifting or engagement of CLo or CHi, respectively.

Figures 3A, 3B:
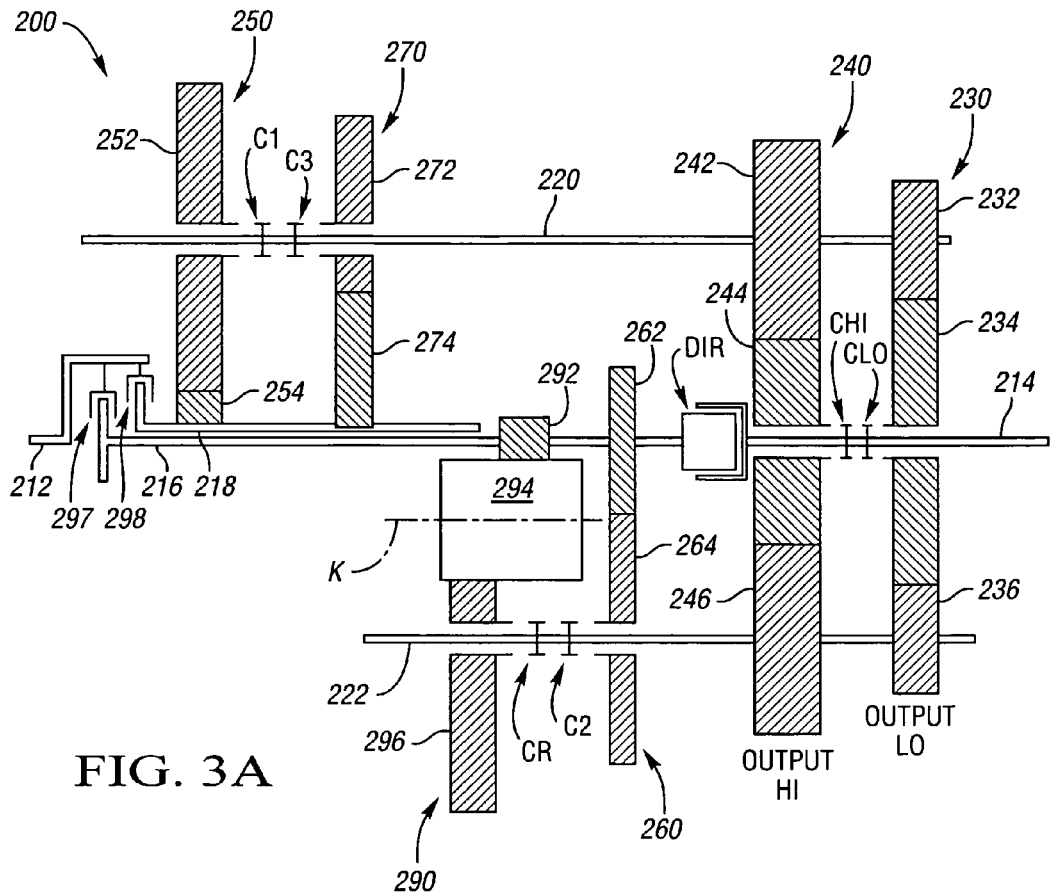
FIG. 3A is a schematic partially cross-sectional representation of a six-speed dual clutch transmission within the scope of the invention.
FIG. 3B is a truth table listing torque-transmitting mechanism engagements for the transmission of FIG. 3A.

Referring to FIG. 3A, an alternative embodiment of a transmission 200 within the scope of the invention is illustrated. The transmission 200 is a six-speed dual clutch transmission. The transmission 200 includes an input shaft 212 and an output shaft 214. An intermediate shaft 216, which may also be referred to as an even shaft, and an intermediate shaft 218, which may also be referred to as an odd shaft, are also used in transmission 200. Countershafts 220 and 222 are offset from the shafts 212, 214, 216 and 218. Additionally, the shafts 212, 214, 216 and 218 may be concentric with one another.

The transmission 200 includes a first output gear set 230 including gears 232, 234 and 236. Gear 232 is connected for common rotation with countershaft 220 and intermeshes with gear 234 which rotates about the output shaft 214. Gear 234 intermeshes with gear 236 which is connected for common rotation with the countershaft 222. The gears 232, 234 and 236 are co-planar.

The transmission 200 also includes a second output gear set 240 which has gears 242, 244 and 246. Gear 242 is connected for common rotation with countershaft 220 and intermeshes with gear 244 which rotates about the output shaft 214. Gear 244 also intermeshes with gear 246 which is connected for common rotation with countershaft 222. Gears 242, 244 and 246 are co-planar.

The transmission 200 also includes a first forward speed gear set 250. The first forward speed gear set 250 includes gear 252 and gear 254. Gear 252 rotates about countershaft 220 and intermeshes with gear 254 which is connected for common rotation with odd shaft 218. The transmission 200 also includes second forward speed gear set 260 which includes gears 262 and 264. Gear 262 is connected for common rotation with even shaft 216 and intermeshes with gear 264 which rotates about countershaft 222. The transmission 200 also includes a third forward speed gear set 270 having gear 272 and gear 274. Gear 272 rotates about countershaft 220 and intermeshes with gear 274 which is connected for common rotation with the odd shaft 218. The transmission 200 also includes reverse gear set 290 which includes gears 292, 294 and 296. Gear 292 is connected for common rotation with the even shaft 216 and intermeshes with gear 294 which is an idler gear rotating about axis K. Idler gear 294 intermeshes with gear 296 which rotates about the countershaft 222.

Thus, the transmission 200 has five gear planes established by the first output gear set 230, the second output gear set 240, the first forward speed gear set 250, the second forward speed gear set 260 and the third forward speed gear set 270. The reverse gear set 290 may be co-planar, establishing a sixth gear plane, or may have the gear 292 offset from gear 296 through the idler gear 294.

The transmission 200 includes numerous torque-transmitting mechanisms. A first input clutch 297 is selectively engageable to connect the input shaft 212 with the even shaft 216. A second input clutch 298 is selectively engageable to connect the input shaft 212 with the odd shaft 218. Torque-transmitting mechanism C1 is selectively engageable to connect gear 252 with countershaft 220. Torque-transmitting mechanism C2 is selectively engageable to connect gear 264 with countershaft 222. Torque-transmitting mechanism C3 is selectively engageable to connect gear 272 with countershaft 220. Torque-transmitting mechanism CR is selectively engageable to connect gear 296 with countershaft 222. First output torque-transmitting mechanism CLo is selectively engageable to connect gear 234 with output shaft 214. A second output torque-transmitting mechanism CHi is selectively engageable to connect gear 244 with the output shaft 214. Finally, a direct drive torque-transmitting mechanism DIR is selectively engageable to connect the even shaft 216 with the output shaft 214. With engagement of torque-transmitting mechanism 297 as well, torque is transferred from the input shaft 212 to the output shaft 214 by engagement of torque-transmitting mechanism DIR.

Referring to FIG. 3B, the torque-transmitting mechanism engagement schedule to establish six forward gear ratios and a reverse gear ratio is illustrated. The column labeled "Shaft Position" (odd or even) refers to engagement of either input clutch 297 ("Even") or input clutch 298 ("Odd"). The first and second input clutches 297 and 298 are selectively alternately engageable as is evident from the truth table of FIG. 3B. Those skilled in the art will readily understand the power flow through the transmission 200 based upon the engagement schedule of FIG. 3B and the discussion of power flow with respect to the transmission 10 of FIG. 1A. As illustrated in FIG. 3B, the direct drive gear ratio for the transmission 200 occurs in the fourth forward gear ratio when DIR and the input clutch 297 are engaged. The first output torque-transmitting mechanism CLo is engaged in underdrive gear ratios (the first, second and third forward gear ratios shown in FIG. 3B) and the second output torque-transmitting mechanism CHi is engaged in overdrive (the fifth and sixth forward gear ratios indicated in FIG. 3B). C1 is used in both the first and fifth forward gear ratios and C2 is used in both the second and sixth forward gear ratios. If a fourth forward speed gear set and a fourth torque-transmitting mechanism are added similar to gear set 80 and C4 of transmission 10, then eight forward gear ratios may be achieved and C3 would be reused in the seventh forward gear ratio. No torque is present on the countershafts 220 and 222 during the direct drive, fourth forward gear ratio. Thus, shifts from the fourth forward gear ratio to the third forward gear ratio or from the fourth forward gear ratio to the fifth forward gear ratio by engaging CLo or CHi, respectively, is done with low effort and at the direct drive gear ratio (indicated in FIG. 3C) rather than necessitating stopping the transmission 200 or operating it at a very low speed as is common with typically employed hi-lo splitters.

Figures 3C, 4:
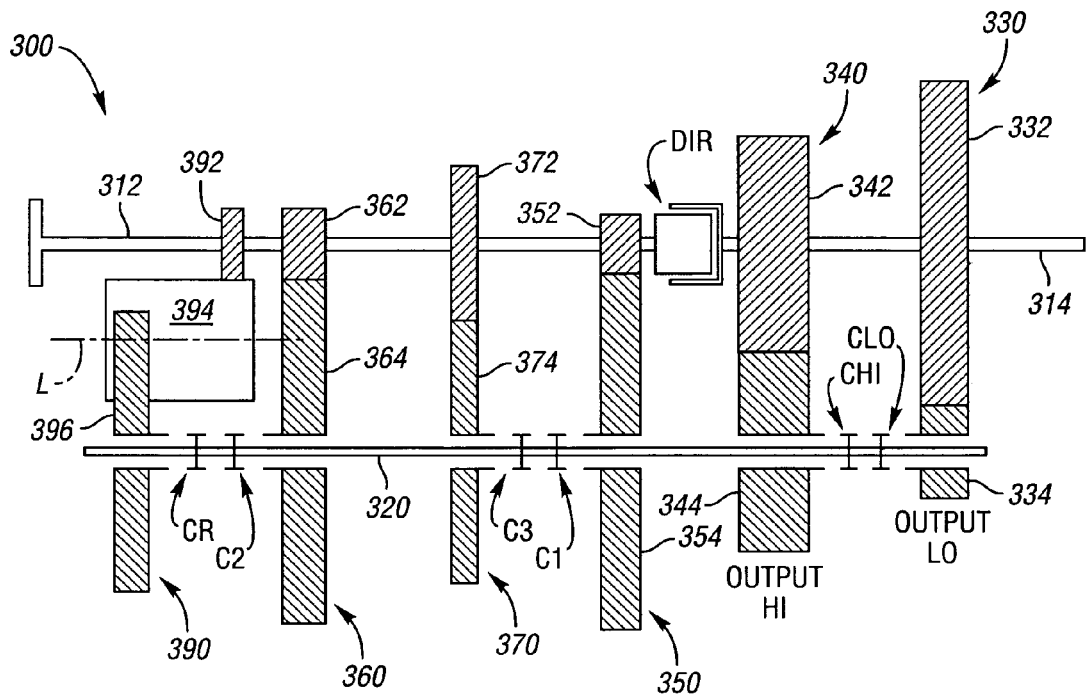
FIG. 3C is a gear ratio chart listing gear ratios achieved by the transmission of FIG. 3A.
FIG. 4 is a schematic partially cross-sectional representation of a six-speed lay shaft transmission within the scope of the invention.

Referring to FIG. 3C, the numerical value of the first through sixth forward gear ratios and the reverse gear ratio (gear stage indicated in the column labeled "Gear") for selected tooth numbers resulting in a wide gear ratio transmission are illustrated. The gear ratios listed in FIG. 3C are achieved utilizing the following gear tooth counts: gears 232 and 236 have 27 teeth; gear 234 has 42 teeth; gears 242 and 246 have 69 teeth; gear 244 has 23 teeth; gear 252 has 50 teeth; gear 254 has 20 teeth; gear 262 has 28 teeth; gear 264 has 47 teeth; gear 272 has 38 teeth; gear 274 has 37 teeth; gear 292 has 21 teeth; and gear 296 has 23 teeth. A more narrow-ratio, or a mid-ratio transmission may be achieved by utilizing other tooth gear counts, as is well understood by those skilled in the art. The engaged torque-transmitting mechanisms as well as the selection of the first input torque-transmitting mechanism 297 (indicated by "Even" in the first column) or second input torque-transmitting mechanism 298 (indicated by "Odd" in the first column) as well as the gear ratio through the engaged input gear set or reverse gear set (listed in the column labeled "Speed"), the gear ratio through the engaged output gear set (indicated in the column labeled "Output") and the total gear ratio from the input member 212 to the output member 214 (indicated in the column labeled "Total") as well as the step ratio between subsequent gear ratios is illustrated. It is apparent from FIG. 3C (as well as from FIG. 1C) that the transmissions have repeating step ratios due to the reuse of gear sets in underdrive and overdrive gear ratios as described above.

Another transmission 300 within the scope of the invention is illustrated in FIG. 4. The transmission 300 is a six-speed lay shaft transmission. The transmission 300 includes an input shaft 312 and an output shaft 314. A countershaft 320 is offset from the input and output shafts 312, 314. Transmission 300 includes a first output gear set 330 having gears 332 and 334. Gear 332 is connected for common rotation with output shaft 314 and intermeshes with gear 334 which rotates about the countershaft 320.

The transmission 300 also includes a second output gear set 340 having gear 342 and gear 344. Gear 342 is connected for common rotation with the output shaft 314 and intermeshes with gear 344 which rotates about the countershaft 320.

The transmission 300 also includes a first forward speed gear set 350 having gears 352 and 354. Gear 352 is connected for common rotation with the input shaft 312 and intermeshes with gear 354 which rotates about countershaft 320.

The transmission 300 also includes a second forward speed gear set 360 having gears 362 and 364. Gear 362 is connected for common rotation with the input shaft 312 and intermeshes with gear 364 which rotates about the countershaft 320.

The transmission 300 also includes a third forward speed gear set 370 having gears 372 and 374. Gear 372 is connected for common rotation with the input shaft 312 and intermeshes with gear 374 which rotates about countershaft 320.

The transmission 300 also includes reverse gear set 390 having gears 392, 394 and 396. Gear 392 is connected for common rotation with the input shaft 312 and intermeshes with gear 394 which is an idler gear rotating about axis L. The idler gear 394 intermeshes with gear 396 which rotates about the countershaft 320.

As is apparent from FIG. 4, the transmission 300 has five gear planes established by the first output gear set 330, the second output gear set 340, the first, second and third forward speed gear sets 350, 360 and 370, respectively. The reverse gear set 390 may have co-planar intermeshing gears, establishing a sixth gear plane, or may have offset gears.

The transmission 300 has numerous torque-transmitting mechanisms. A first output torque-transmitting mechanism CLo is selectively engageable to connect gear 334 with countershaft 320 for common rotation. A second output torque-transmitting mechanism CHi is selectively engageable to connect gear 344 with countershaft 320 for common rotation. Torque-transmitting mechanism C1 is selectively engageable to connect gear 354 with countershaft 320 for common rotation. Torque-transmitting mechanism C2 is selectively engageable to connect gear 364 with countershaft 320 for common rotation. Torque-transmitting mechanism C3 is selectively engageable to connect gear 374 with countershaft 320 for common rotation. Torque-transmitting mechanism CR is selectively engageable to connect gear 396 with countershaft 320 for common rotation. Torque-transmitting mechanism DIR is selectively engageable to connect the input shaft 312 with the output shaft 314. Six forward gear ratios and a reverse gear ratio are established by the selective engagement of the torque-transmitting mechanisms of transmission 300 as follows. A reverse gear ratio is established with the engagement of CR and CLo; a first forward gear ratio is established with the engagement of C1 and CLo; a second forward gear ratio is established with the engagement of C2 and CLo; and third forward gear ratio is established with the engagement of C3 and CLo; a direct drive or fourth forward gear ratio is established with the engagement of DIR; a fifth forward gear ratio is established with the engagement of C1 and CHi; a sixth forward gear ratio is established with the engagement of C2 and CHi; and a reverse gear ratio is established with the engagement of the CLo and CR. As with transmissions 10, 100 and 200 described above, because the direct drive gear ratio is established without engagement of either CHi or CLo, no torque is present on countershaft 320 during the direct drive gear ratio and, therefore, a downshift to a subsequent underdrive gear ratio or an upshift to an overdrive gear ratio may be established by engaging CLo or CHi, respectively, with little effort and at direct drive speed and the additional torque-transmitting mechanisms required for the on-coming gear ratio may be preselected.

Figure 5:
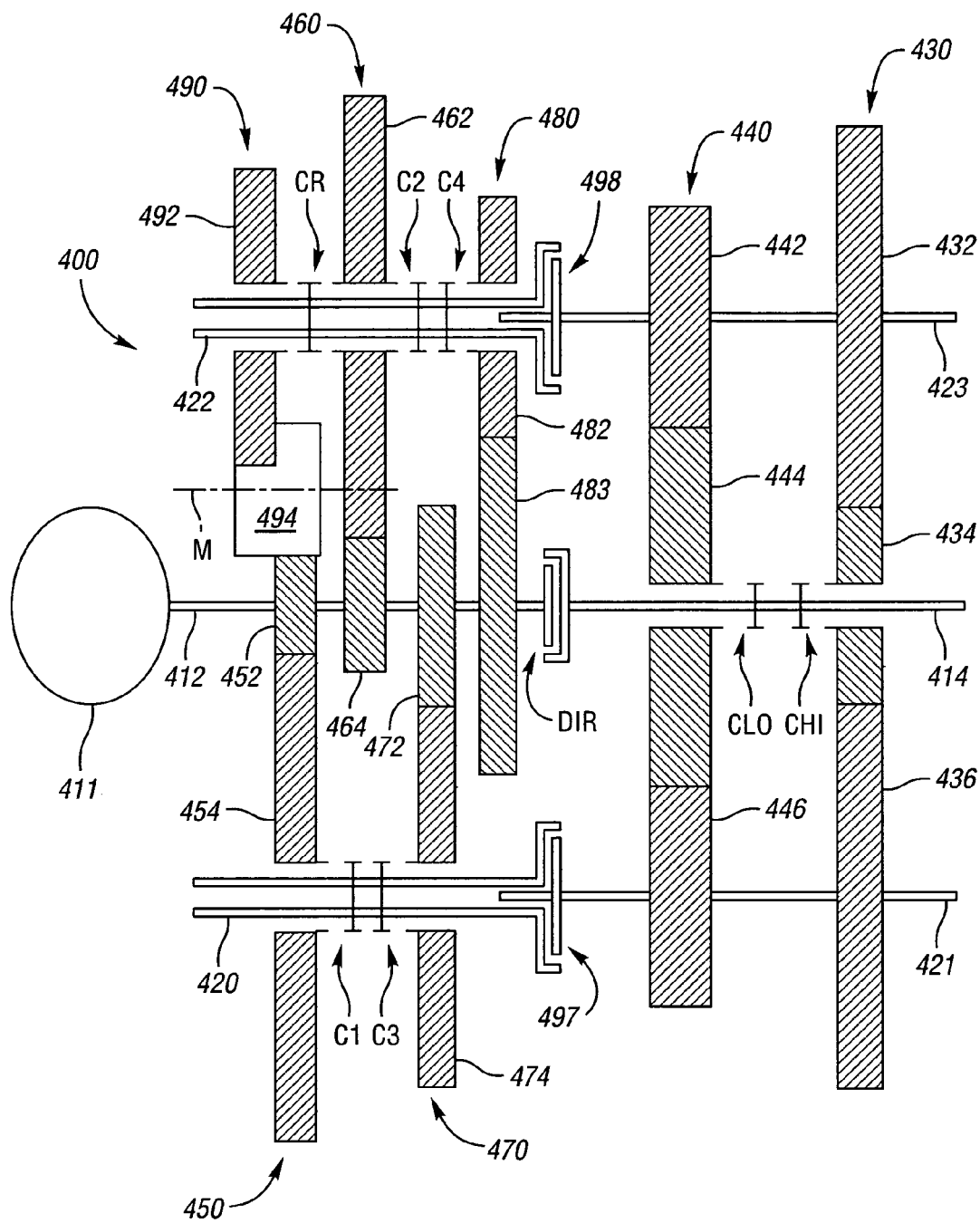
FIG. 5 is a schematic partially cross-sectional representation of an alternative dual clutch transmission within the scope of the invention.

Another transmission 400 within the scope of the invention is illustrated in FIG. 5. The transmission 400 is an alternative dual clutch transmission and may be operated as a five-speed, a six-speed, a seven-speed, an eight-speed or a nine-speed transmission as will be described below. The transmission 400 includes an input shaft 412 through which torque is received from an engine (not shown) through a torque converter or starting clutch 411. The transmission 400 also includes an output shaft 414 which is axially aligned with the input shaft 412. First and second countershafts 420, 422, respectively, are offset from the input shaft 412 and from the output shaft 414. Transfer shaft 421 is axially aligned with the first countershaft 420 and transfer shaft 423 is axially aligned with the second countershaft 422.

The transmission 400 includes a first output gear set 430 having gears 432, 434 and 436. Gear 432 is connected for common rotation with transfer shaft 423 and intermeshes with gear 434 which rotates about the output shaft 414. Gear 436 intermeshes with gear 434 and is connected for common rotation with the transfer shaft 421.

The transmission 400 also includes a second output gear set 440 having gears 442, 444 and 446. Gear 442 is connected for common rotation with the transfer shaft 423 and intermeshes with gear 444 which rotates about the output shaft 414. Gear 446 is connected for common rotation with the transfer shaft 421 and also intermeshes with gear 444.

The transmission 400 includes a first forward speed gear set 450 having gears 452 and 454. Gear 452 is connected for common rotation with the input shaft 412 and intermeshes with gear 454 which rotates about the countershaft 420.

The transmission 400 also includes a second forward speed gear set 460 having gears 462 and 464. Gear 462 rotates about the countershaft 422 and intermeshes with gear 464 which is connected for common rotation with the input shaft 412.

The transmission 400 also includes a third forward speed gear set 470 which includes gears 472 and 474. Gear 472 is connected for common rotation with the input shaft 412 and intermeshes with gear 474 which rotates about the countershaft 420.

The transmission 400 also includes a fourth forward speed gear set 480 which includes gears 482 and 483. Gear 482 rotates about countershaft 422 and intermeshes with gear 483 which is connected to common rotation with the input shaft 412.

The transmission 400 also includes a reverse gear set 490 having gears 492 and 494. Gear 492 rotates about countershaft 422 and intermeshes with gear 494 which is an idler gear rotating about axis M. Gear 494 also intermeshes with gear 452 of the first forward speed gear set 450.

As is apparent from FIG. 5, the transmission 400 has six gear planes established by the first output gear set 430, the second output gear set 440, and the first, second, third and fourth forward speed gear sets 450, 460, 470 and 480, respectively. The reverse gear set 490 may be offset from the first input gear set 450 through the idler gear 494 as shown in FIG. 5 to establish a seventh gear plane or may be made co-planar with the first input gear set 450 so that only six gear planes are utilized.

The transmission 400 has numerous torque-transmitting mechanisms. A first output torque-transmitting mechanism CLo is selectively engageable to connect gear 444 with the output shaft 414 for common rotation. A second output torque-transmitting mechanism CHi is selectively engageable to connect gear 434 with the output shaft 414 for common rotation. CHi and CLo may be integrated as a dual torque-transmitting mechanism and referred to as Hi-Lo shifting device. Torque-transmitting mechanism C1 is selectively engageable to connect gear 454 with countershaft 420 for common rotation. Torque-transmitting mechanism C2 is selectively engageable to connect gear 462 with countershaft 422 for common rotation. Torque-transmitting mechanism C3 is selectively engageable to connect gear 474 with countershaft 420 for common rotation. Torque-transmitting mechanism C4 is selectively engageable to connect gear 482 with countershaft 422 for common rotation. Torque-transmitting mechanism CR is selectively engageable to connect gear 492 with countershaft 422 for common rotation. Torque-transmitting mechanism 497 is a first input torque-transmitting mechanism selectively engageable to transfer torque from countershaft 420 to transfer shaft 421. Torque-transmitting mechanism 498 is a second input torque-transmitting mechanism selectively engageable in alternate fashion from torque-transmitting mechanism 497 to transfer torque from countershaft 422 to transfer shaft 423 (i.e., torque-transmitting mechanisms 497 and 498 are engaged in alternate gear ratios). Torque-transmitting mechanism DIR is selectively engageable to connect the input shaft 412 with the output shaft 414.

Five or six forward gear ratios and a reverse gear ratio may be established by the selectively engagement of the torque-transmitting mechanisms of transmission 400 as follows. A reverse gear ratio is established with the engagement of the torque-transmitting mechanisms 498, CR and CLo; a first forward gear ratio is established with the engagement of the torque-transmitting mechanisms 497, C1 and CLo; a second forward gear ratio is established with the engagement of torque-transmitting mechanism 498, C2 and CLo; a third forward gear ratio is established with the engagement of torque-transmitting mechanism 497, C3 and CLo; a direct or fourth forward gear ratio is established with the engagement of DIR; a fifth forward gear ratio established with the engagement of torque-transmitting mechanism 498, C2 and CHi. With the above referenced gear ratios, a five-speed transmission is achieved. Optionally, a sixth forward gear ratio may be added by engaging torque-transmitting mechanism 497 and C3 while simultaneously releasing torque-transmitting mechanism 498 and C2 while CHi remains engaged after the fifth forward gear ratio. Thus, if the transmission 400 is to be utilized as a five or six forward speed transmission, torque-transmitting mechanism C4 and the fourth forward speed gear set 480 are not required and may be omitted for cost savings. Accordingly, only five gear planes are required for the five- or six-speed options (or six if the reverse gear set 490 is not co-planar with the first gear set 450). An additional plane is required for the input clutches 497 and 498 and torque-transmitting mechanism DIR. As few as fourteen gears and nine torque-transmitting mechanisms are required. Fewer torque-transmitting mechanisms are required if adjacent torque-transmitting mechanisms are integrated as dual clutches (e.g., if CHi and CLo are integrated as a dual torque-transmitting mechanism).

The transmissions 400 may be utilized with an alternate engagement schedule of the torque-transmitting mechanisms described above to achieve seven or eight forward gear ratios. The reverse gear ratio is established with the engagement of torque-transmitting mechanism 498, CR and CLo, as described above with respect to the five- or six-speed options. A first forward gear ratio is established with the engagement of torque-transmitting mechanism 497, C1 and CLo; a second forward gear ratio is established with the engagement of torque-transmitting mechanism 498, C2 and CLo; a third forward gear ratio is established with the engagement of torque-transmitting mechanism 497, C3 and CLo; a fourth forward gear ratio is established with the engagement of torque-transmitting mechanism 498, C4 and CLo; a direct drive gear ratio or fifth forward gear ratio is established with the engagement of DIR; a sixth forward gear ratio is established with the engagement of torque-transmitting mechanism 498, C2 and CHi; a seventh forward gear ratio is established with the engagement of torque-transmitting mechanism 497, C3 and CHi. If desired, an eighth forward gear ratio may be established with the engagement of torque-transmitting mechanism 498, C4 and CHi.

Nine forward gear ratios may be achieved by the transmission 400 if the engagement schedule described above with respect to the eight-speed option is modified in the sixth through eighth forward gear ratios. Specifically, the engagement of the first or second input torque-transmitting mechanisms 497 and 498 is reversed. In the sixth forward gear ratio, torque-transmitting mechanism 497, C1 and CHi are engaged, in the seventh forward gear ratio, torque-transmitting mechanism 498, C2 and CHi are engaged, in the eighth forward gear ratio, torque-transmitting mechanism 497, C3 and CHi are engaged, and in the ninth forward gear ratio, torque-transmitting mechanism 498, C4 and CHi are engaged.

For the seven-, eight- or nine-speed option, six gear planes as well as a plane for the torque-transmitting mechanisms 497, 498 and DIR, sixteen gears and ten torque-transmitting mechanisms are necessary (or fewer torque-transmitting mechanisms if adjacent torque-transmitting mechanisms are integrated; i.e., only nine torque-transmitting mechanisms if CLo and CHi are integrated as a dual torque-transmitting mechanism).

First and second output gear sets and the CLo and CHi torque-transmitting mechanisms may also be applied to achieve five- or seven-speed transmissions, for example, in the transmissions 10 and 200. For example, a five-speed transmission would be achieved by the transmission 200 of FIG. 3A if gear set 270 and torque-transmitting mechanism C3 were removed. Similarly, a seven-speed transmission would be achieved if, in the transmission 10 of FIG. 1A, C4 and CHi were not engaged after the seventh gear ratio listed in the truth table of FIG. 1B. For some applications, the low eighth gear ratio may not be desirable. A seven-speed transmission would be achieved by the transmission of FIG. 3A if, after the sixth gear ratio, clutch 298 and torque-transmitting mechanism C3 were engaged and clutch 297 and torque-transmitting mechanism C2 simultaneously released while CHi remained engaged.

While the best modes for carrying out the invention have been described in detail, those familiar with the art to which this invention relates will recognize various alternative designs and embodiments for practicing the invention within the scope of the appended claims.

The invention claimed is:

1. A multi-speed transmission comprising:
an input shaft;
an output shaft;
a first countershaft;
a direct drive torque-transmitting mechanism selectively engagable for transferring torque from said input shaft to said output shaft;
a first output gear set having co-planar intermeshing gears and a second output gear set having co-planar intermeshing gears axially-spaced from said first output gear set; wherein each of set first and second output gear sets has a first gear and a second gear intermeshing therewith, one of said first and second gears being connected for common rotation with one of said output shaft and said first countershaft and the other of said first and second gears being connected for rotation about the other of said output shaft and said first countershaft;
a first output torque-transmitting mechanism selectively engageable to connect said gear of said first output gear set that is connected for rotation about said respective shaft with said respective shaft for common rotation therewith; and
a second output torque-transmitting mechanism selectively engageable to connect said gear of said second output gear set that is connected for rotation about said respective shaft for common rotation therewith;
wherein said first output torque-transmitting mechanism is engaged during underdrive gear ratios and said second output torque-transmitting mechanism is engaged during overdrive gear ratios.

2. The multi-speed transmission of claim 1, further comprising:
a first and a second input torque-transmitting mechanism alternately selectively engageable to transfer torque from said input shaft through one of said output gear sets or said direct drive torque-transmitting mechanism to said output shaft.

3. The multi-speed transmission of claim 1, further comprising:
a plurality of additional co-planar gear sets, each axially-spaced from said first and second output gear sets;
a plurality of additional torque-transmitting mechanisms separately selectively engageable in a first order during engagement of said first output torque-transmitting mechanism to transfer torque from said input shaft to said output shaft through at least some of said additional co-planar gear sets, thereby establishing respective underdrive forward gear ratios; and
each of said additional torque-transmitting mechanisms being separately selectively engageable in said first order during engagement of said second output torque-transmitting mechanism to transfer torque from said input shaft to said output shaft through at least some of said additional co-planar gear sets to thereby establish respective overdrive forward gear ratios.

4. The multi-speed transmission of claim 3, wherein said additional co-planar gear sets are characterized by an absence of torque during engagement of said direct drive torque-transmitting mechanism.

5. The multi-speed transmission of claim 1, further comprising:
a first, a second and a third input gear set having co-planar intermeshing gears, each input gear set axially-spaced from one another and from said first and second output gear sets;
a first, a second and a third torque-transmitting mechanism each selectively engageable for connecting a different selected one of said gears of said first, second and third input gear sets with said first countershaft to transfer torque from said input shaft to said first countershaft, said selective engagement of said torque-transmitting mechanisms thereby establishing six forward gear ratios.

6. The multi-speed transmission of claim 5, further comprising:
a fourth input gear set having co-planar intermeshing gears axially-spaced from said other input gear sets and said output gear sets; and
a fourth torque-transmitting mechanism selectively engageable for connecting a selected one of said gears of said fourth input gear set with said first countershaft to transfer torque from said input shaft to said first countershaft, said selective engagement of said torque-transmitting mechanisms thereby establishing eight forward gear ratios.

7. The multi-speed transmission of claim 1, further comprising:
a second countershaft;
a first, a second and a third input gear set having co-planar intermeshing gears, each input gear set axially-spaced from one another and from said first and second output gear sets;
a first and a second input torque-transmitting mechanism alternately selectively engageable to transfer torque from said input shaft to one of said first, second and third input gear sets;
a first, a second and a third torque-transmitting mechanism each selectively engageable for connecting a different selected one of said gears of said first, second and third input gear sets with said one of said first and second countershafts to transfer torque through said gear set to said respective countershaft; and
said selective engagement of said torque-transmitting mechanisms thereby establishing six forward gear ratios.

8. The multi-speed transmission of claim 7, further comprising:
a fourth input gear set having co-planar intermeshing gears axially-spaced from said other input gear sets and said output gear sets; and
a fourth torque-transmitting mechanism selectively engageable for connecting a selected one of said gears of said fourth input gear set with one of said first and second countershafts to transfer torque through said fourth input gear set to said respective countershaft, said selective engagement of said torque-transmitting mechanisms thereby establishing eight forward gear ratios.

9. The multi-speed transmission of claim 1, further comprising:
a reverse gear set having intermeshing gears axially-spaced from said output gear sets at least one of which rotates about said first countershaft; and
a reverse torque-transmitting mechanism selectively engageable for connecting said gear of said reverse gear set which rotates about said first countershaft with said first countershaft for common rotation therewith.

10. The multi-speed transmission of claim 1, wherein said transmission is characterized by an absence of torque-transmitting mechanisms located axially between said output gear sets other than said first and second output torque-transmitting mechanisms.

11. The multi-speed transmission of claim 1, wherein said first and said second output torque-transmitting mechanisms are integrated as a dual torque-transmitting mechanism.

12. The multi-speed transmission of claim 1, further comprising:
a second countershaft;
a first, a second and a third input gear set having co-planar intermeshing gears, each input gear set axially-spaced from one another and from said first and second output gear sets;
a first, a second and a third torque-transmitting mechanism each selectively engageable for connecting a different selected one of said gears of said first, second and third input gear sets with said one of said first and second countershafts to transfer torque through said gear set to said respective countershaft;
a first and a second transfer shaft, different members of the first and second output gear sets being connected for common rotation with said transfer shafts;
a first and a second input torque-transmitting mechanism alternately selectively engageable to transfer torque from said first and second countershafts, respectively, to said first and second transfer shafts, respectively; and
said selective engagement of said torque-transmitting mechanisms thereby establishing six forward gear ratios.

13. The multi-speed transmission of claim 12, further comprising:
a fourth input gear set having co-planar intermeshing gears axially-spaced from said other input gear sets and said output gear sets; and
a fourth torque-transmitting mechanism selectively engageable for connecting a selected one of said gears of said fourth input gear set with one of said first and second countershafts to transfer torque through said fourth input gear set to said respective countershaft, said selective engagement of said torque-transmitting mechanisms thereby establishing at least eight forward gear ratios.

14. A multi-speed transmission comprising:
an input shaft;
an output shaft;
a first countershaft;
a direct drive torque-transmitting mechanism selectively engagable for transferring torque from said input shaft to said output shaft;
a first output gear set having co-planar intermeshing gears and a second output gear set having co-planar intermeshing gears axially-spaced from said first output gear set; wherein each of set first and second output gear sets has a first gear and a second gear intermeshing therewith, one of said first and second gears being connected for common rotation with one of said output shaft and said first countershaft and the other of said first and second gears being connected for rotation about the other of said output shaft and said first countershaft;
a first output torque-transmitting mechanism selectively engageable to connect said gear of said first output gear set that is connected for rotation about said respective shaft with said respective shaft for common rotation therewith;
a second output torque-transmitting mechanism selectively engageable to connect said gear of said second output gear set that is connected for rotation about said respective shaft for common rotation therewith;
wherein said first output torque-transmitting mechanism is engaged during underdrive gear ratios and said second output torque-transmitting mechanism is engaged during overdrive gear ratios;
a reverse, first, second and third input gear set each having co-planar intermeshing gears, each set being axially-spaced from one another and from said output gear sets; and
a reverse, first, second and third torque-transmitting mechanism selectively engageable for transferring torque from said input shaft to said output shaft through said respective one of said gear sets, said selective engagement of said torque-transmitting mechanisms thereby establishing at least six forward gear ratios and a reverse gear ratio.

15. The multi-speed transmission of claim 14, wherein said gear sets have a total of thirteen gears.

16. The multi-speed transmission of claim 14, further comprising:
- a second countershaft, selected ones of said gears of said gear sets being rotatable about said second countershaft and selectively engageable therewith by selective ones of said torque-transmitting mechanisms; and
- two input torque-transmitting mechanisms, each selectively alternately engageable to transfer torque from said input shaft to a respective one of said countershafts; wherein said gear sets have a total of fifteen gears.

17. The multi-speed transmission of claim 14, further comprising:
- a fourth input gear set axially-spaced from said other sets of intermeshing gears and from said output gear sets, said gear sets having fifteen total gears; and
- a fourth torque-transmitting mechanism selectively engageable for transferring torque from said input shaft to said output shaft to establish with said other torque-transmitting mechanisms eight forward gear ratios and said reverse gear ratio.

18. The multi-speed transmission of claim 17, further comprising:
- a second countershaft, selected ones of said gears of said gear sets being rotatable about said second countershaft and selectively engageable therewith by selective ones of said torque-transmitting mechanisms; and
- two input torque-transmitting mechanisms, each selectively alternately engageable to transfer torque from said input shaft to a respective one of said countershafts; wherein said gear sets have a total of sixteen gears.

19. A multi-speed transmission comprising:
- an input shaft;
- an output shaft;
- a first countershaft;
- a direct drive torque-transmitting mechanism selectively engagable for transferring torque from said input shaft to said output shaft;
- a first output gear set having co-planar intermeshing gears and a second output gear set having co-planar intermeshing gears axially-spaced from said first output gear set; wherein each of set first and second output gear sets has a first gear and a second gear intermeshing therewith, one of said first and second gears being connected for common rotation with one of said output shaft and said first countershaft and the other of said first and second gears being connected for rotation about the other of said output shaft and said first countershaft;
- a first output torque-transmitting mechanism selectively engageable to connect said gear of said first output gear set that is connected for rotation about said respective shaft with said respective shaft for common rotation therewith;
- a second output torque-transmitting mechanism selectively engageable to connect said gear of said second output gear set that is connected for rotation about said respective shaft for common rotation therewith;
- wherein said first output torque-transmitting mechanism is engaged during underdrive gear ratios and said second output torque-transmitting mechanism is engaged during overdrive gear ratios;
- a plurality of additional co-planar gear sets, each axially-spaced from said first and second output gear sets;
- a plurality of additional torque-transmitting mechanisms separately selectively engageable in a first order during engagement of said first output torque-transmitting mechanism to transfer torque from said input shaft to said output shaft through at least some of said additional co-planar gear sets, thereby establishing respective underdrive forward gear ratios; and
- each of said additional torque-transmitting mechanisms being separately selectively engageable in said first order during engagement of said second output torque-transmitting mechanism to transfer torque from said input shaft to said output shaft through at least some of said additional co-planar gear sets to thereby establish respective overdrive forward gear ratios.

20. The multi-speed transmission of claim 19, wherein said multi-speed transmission has at least eight forward gear ratios and a reverse gear ratio.

* * * * *